Jan. 29, 1952    R. E. SEARS    2,583,800
ACTUATING DEVICE

Filed Dec. 21, 1948    3 Sheets-Sheet 1

INVENTOR.
RICHARD E. SEARS
BY
Frank H. Harmon
ATTORNEY

Jan. 29, 1952   R. E. SEARS   2,583,800
ACTUATING DEVICE
Filed Dec. 21, 1948   3 Sheets-Sheet 2
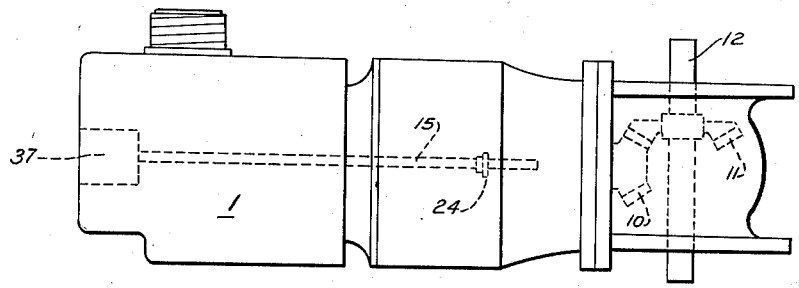
Fig-2-
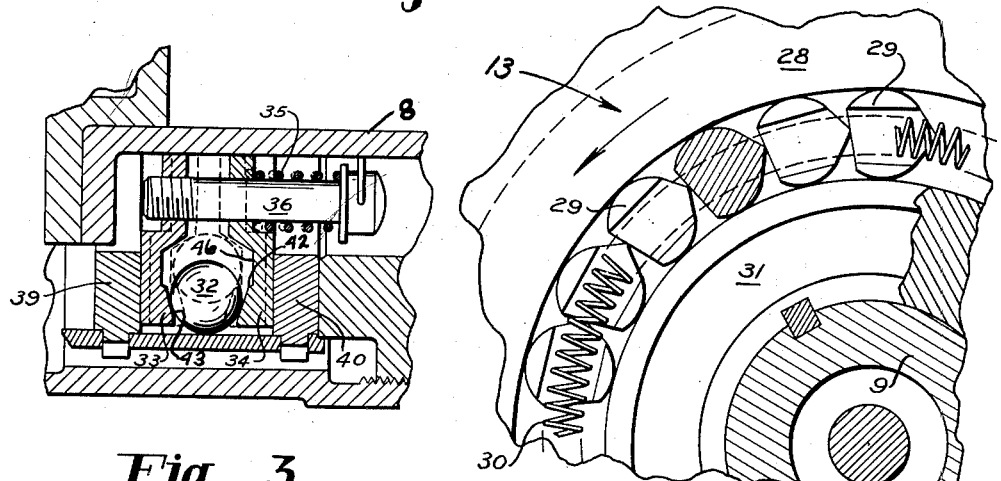
Fig-3-
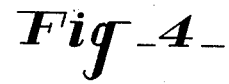
Fig-4-
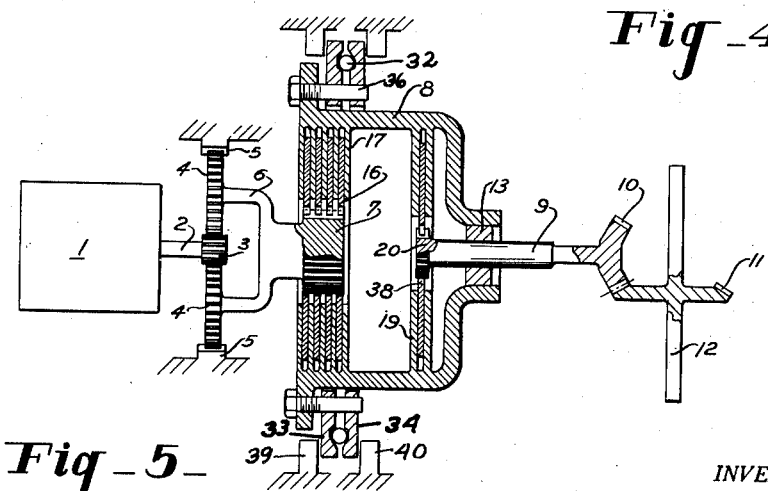
Fig-5-
INVENTOR.
RICHARD E. SEARS
BY
Frank H. Harmon
ATTORNEY Jan. 29, 1952  R. E. SEARS  2,583,800
ACTUATING DEVICE
Filed Dec. 21, 1948  3 Sheets-Sheet 3
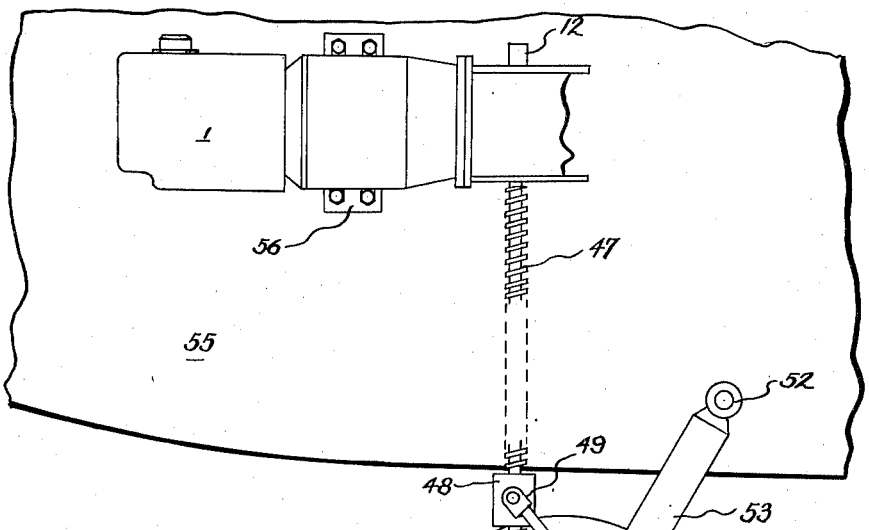
Fig _6_
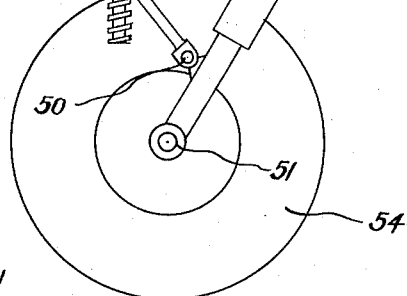
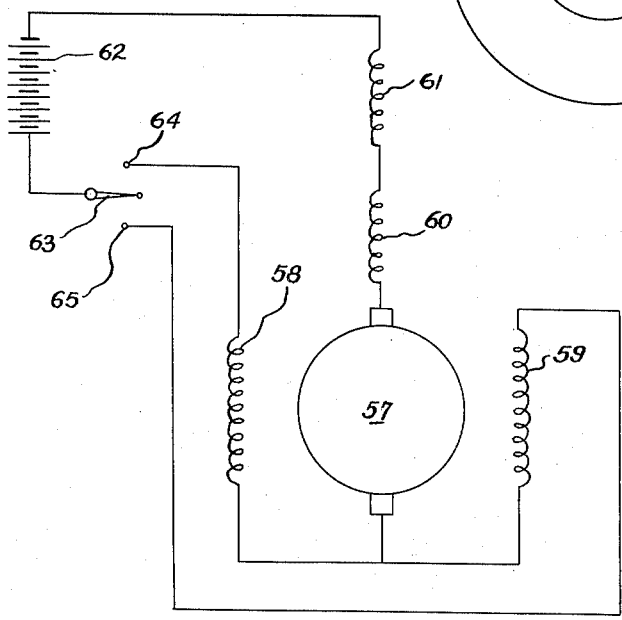
Fig _7_
INVENTOR.
RICHARD E. SEARS
BY
*Frank H. Harmon*
ATTORNEY Patented Jan. 29, 1952

2,583,800

UNITED STATES PATENT OFFICE 2,583,800

ACTUATING DEVICE

Richard E. Sears, Cleveland Heights, Ohio, assignor to Jack & Heintz Precision Industries, Inc., Cleveland, Ohio, a corporation of Delaware Application December 21, 1948, Serial No. 66,563

4 Claims. (Cl. 192—.09)

This invention relates to actuating devices for raising and lowering a load and one of its primary objects is to provide an electrically driven load raising and lowering actuator that operates in either direction at a predetermined speed regardless of the influence of weight being raised or lowered.

Another object is to provide an improved actuator to include, for load raising purposes, a reversible electric motor and driving shaft, an actuator output shaft for driving the load and a drive between the motor shaft and output shaft comprising a planetary reduction gear train driven by the gear train, a torque release mechanism selectively energized by a solenoid for driving an overriding clutch in one direction only for driving the output shaft.

Another object is to provide an improved actuator to include, for load lowering purposes, a centrifugal braking means, whereby when the load is released to drop of its own weight and the motor reversed and the rate of descent of the load exceeds that of the motor shaft the motor current will drop and tend to reverse, release the solenoid and the torque release and set up torque in the over-riding clutch, whereas the excessive speed makes effective the braking means between the torque release carrier and the housing to brake the load speed to normal.

A further object is to apply and adapt such a load raising and lowering actuator to aircraft for extending and retracting landing gear, bomb bay doors and the like where the latter may be of the drop type for extension but under control of the actuator.

With the foregoing and other objects in view the invention resides in the combination of parts and in the details of construction hereinafter set forth in the following specification and appended claims, certain embodiments thereof being illustrated in the accompanying drawings, in which:

Figure 2 is a view in side elevation of the actuating device, showing in dotted lines the solenoid, pull rod, gears driven by the output shaft and the driven shaft, representing the work to be driven.

Figure 3 is a detailed enlarged view in longitudinal section of the brake assembly including the drums carried by the housing and the spring and ball operated brake shoes carried by the driving barrel.

Figure 4 is a view in section taken along line 4—4 of Figure 1 showing the over-riding clutch;

Figure 5 is a schematic view showing the drive from the motor and the work, including the motor shaft, reduction gear train, torque release, over-riding clutch, output shaft and gearing between the latter and the work;

Figure 6 is a schematic partial view in side elevation of an airplane, showing the actuator and its driving connection with a retractible landing gear; and Figure 7 is a wiring diagram of the actuator unit.

Figure 1:
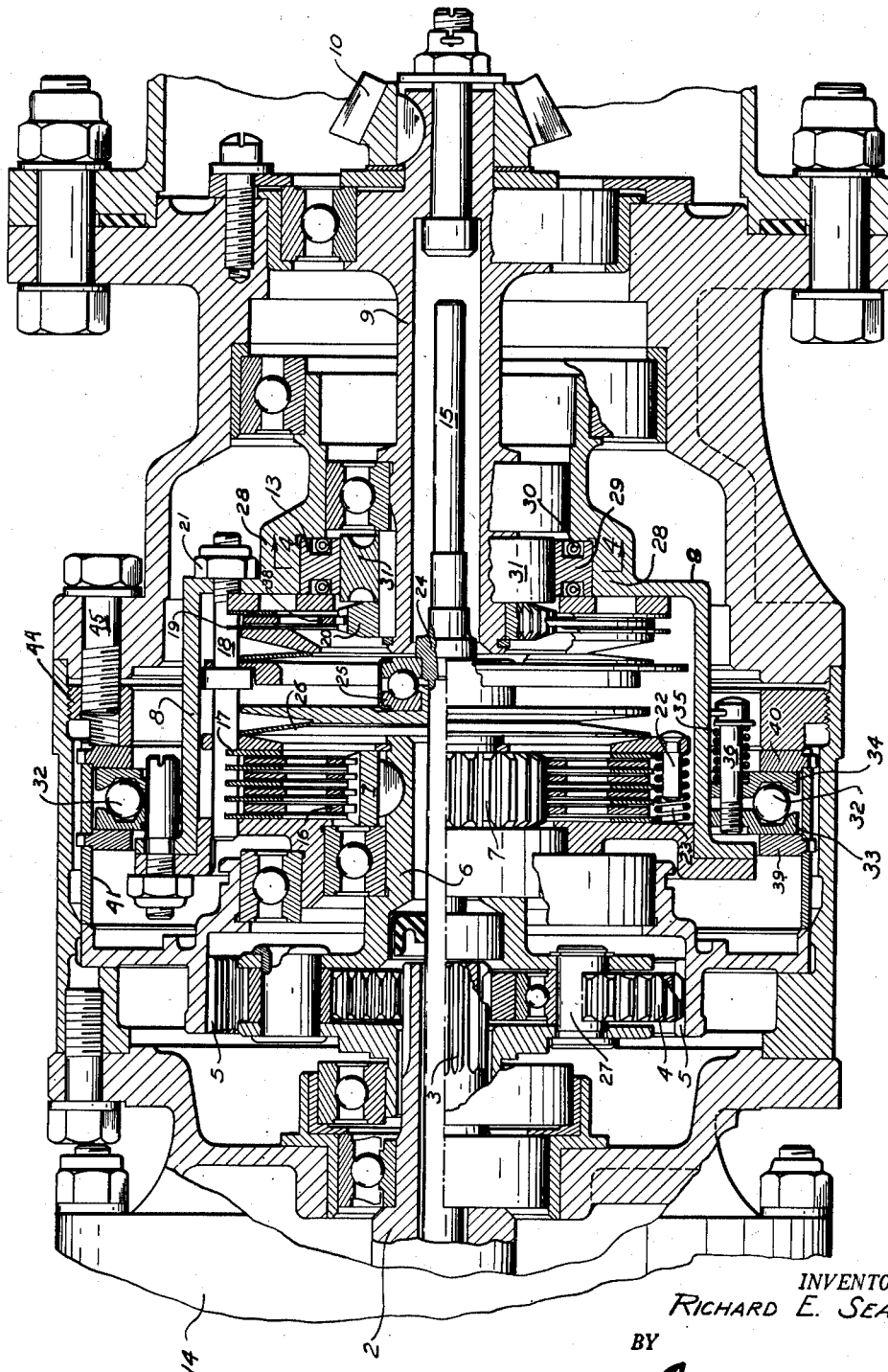
Figure 1 is a view in longitudinal section of the actuating device, with a fragmentary portion of the motor housing being shown in side elevation.

Referring more particularly to the drawings, Figure 5 is a general schematic diagram of the actuating device, in which an electric motor 1 drives a shaft 2 carrying a pinion 3 that forms the sun gear of a planetary gear system by meshing with planet gears 4 that mesh with a stationary internal gear 5. The planet gear carrier 6 is integral with a pinion 7 that meshes with internally toothed clutch plates 16 alternately arranged between externally toothed clutch plates 17 meshing with the plate carrier 8 of a torque release device, shown in greater detail in Figure 1 and to be later described. The output shaft 9 carries a bevel gear 10 for mesh with a bevel gear 11 carried by member 12, representing the work to be operated in either direction. For operation of the work in one direction, such as the retraction of an aircraft landing gear, the drive of the output shaft by the carrier 8 is through clutch plate 38 and gear 20 of shaft 9 and through an over-riding clutch 13 to output shaft 9, whereas, in extending the landing gear by motor drive the drive from carrier 8 to the output shaft is in the opposite direction and by-passes over-riding clutch 13 and is through clutch plate 38 of the torque release device to gear 20 carried by the output shaft 9.

Referring to Figure 1, that part of the housing 14 shown broken away and in elevation, houses a reversible electric motor for driving a hollow shaft 2 and a solenoid 37 for longitudinally extending and retracting a solenoid shaft 15 disposed inside of the hollow motor shaft 2.

The torque release device comprises a series of internally toothed clutch plates 16 that mesh with pinion 7 that is integral with the planet carrier 6. Alternately arranged between clutch plates 16 are a series of clutch plates 17 that are externally toothed to be rigid with member 18 of the plate carrier, or barrel, 8. In addition to this series of plates there are additional plates 19 carried by member 18 of the barrel. Arranged to engage with plates 19 is a plate 38 internally toothed to mesh with gear 20 that is integral with the output shaft 9. Member 18 is adjustable longitudinally and held in adjusted position by nuts 21. A guide pin 22 and coil spring 23 serves as a means of releasing clutch plate face friction.

When the motor switch is actuated to turn the motor shaft in the proper direction for landing gear retraction, the solenoid 37 is energized to retract its shaft 15 to the left. This shaft, or pull rod 15, carries a rigid enlarged knob 24 that bears against a ball bearing assembly 25, forcing it and a convex spring 26 to the left against the torque release clutch plates 16 and 17 to resiliently compress them into sufficient frictional engagement for driving purposes.

Thus, when the motor and solenoid are thus turned on for landing gear retraction purposes, torque from the motor is transmitted through the reduction gears of the planetary system to the torque release mechanism and thence through the over-riding clutch 13 to the output shaft 9. In other words, the pinion 3 of the motor shaft 2, meshing with the planet gears 4, rotate the latter about their pivots 27, as the planet gears 4 mesh with the stationary internal gear 5. Thus the planet carrier 6, which supports the planet gear pivots 27, is rotated and drives its integral pinion 7. This pinion 7, in meshing with the internally toothed plates 16, and plates 16 and 17 of the torque release mechanism being in frictional drive relationship, the torque release and its carrier, or barrel 8, are driven. Barrel 8 carries an over-riding clutch 13, shown in detail in Figure 4 and later to be described in detail. When the input shaft 2 and barrel 8 are rotating in the above-described direction for landing gear retraction the over-riding clutch 13 is effective to transmit such rotational drive to the output shaft 9 and is ineffective as a drive when the barrel 8 is rotated in the opposite direction.

Referring to Figure 4, the over-riding clutch, referred to generally as 13 in Figures 1 and 5, comprises an outer member 28 rigid with barrel 8, a series of sprags 29 joined together by a spring 30 and an inner member 31 keyed to the output shaft 9. As indicated by the arrow, rotation of the barrel 8 and outer member 28 in a counterclockwise direction, renders the overriding clutch 13 an effective means to drive the output shaft 9, whereas, rotation in the opposite direction is not transmitted to the output shaft.

As stated before, one of the objects of the invention is to employ, within limits, the weight of the landing gear as an aiding factor in extension. In other words, the landing gear is of the "drop" type, it being unnecessary to drive the landing gear into extension as gravity will accomplish this. However, I desire to regulate the speed of drop and also insure extension in the event that the force of gravity fails in complete extension of the landing gear.

When it is desired to extend the landing gear, it is manually released from locked position and the motor switch changed to reverse the drive of the motor shaft. The plates 16 and 17 of the torque release are still compressed by pull rod 15. The landing gear is thus free to drop by gravity. If, however, the speed of gravity drop of the landing gear tends to exceed the speed of the motor shaft the motor current drops and tends to reverse direction. In the meanwhile when the motor current reduces to a small value, the solenoid 37 releases, disengaging the pull rod 15 and destroys the friction between the plates 16 and 17 of the torque release. This, by itself, would permit the landing gear to drop more rapidly. However, since the overriding clutch 13 is in the same direction, even if the rotation is in the opposite direction, there is opposite engaging torque at this point.

This excess speed will then cause sufficient centrifugal force to be set up to force a series of balls 32, which are rotating at the same speed, to be thrown radially outwardly from their positions shown in dotted lines into their positions shown in full lines in Figure 3. This forces the ball retaining plates 33 and 34 apart against the action of spring 35 so as to form a friction brake on the stationary members 39 and 40 to render the torque release effective so as to slow down the speed of drop of the landing gear. As soon as this drop speed slows down sufficiently, springs 35 will force the balls 32 back into their positions shown in full lines and destroy the effectiveness of the brake assembly. In further detail, members 39 and 40 are carried by member 41, which is rigid with the stationary housing and held in place by a screw-threaded ring 44. Ring 44 receives bolts 45 to hold the two adjoining sections of the housing together. The two brake shoes 33 and 34 have oppositely concave bevelled faces to receive a series of circularly arranged balls 32 and the outer extensions of the shoes receive a series of bolts 36. Bolts 36 extend slidably through shoe 34 and is screw threaded in shoe 33. Springs 35, surrounding bolts 36, urge the shoes together away from binding frictional engagement with brake drum members 39 and 40. Bolts 36 connect the shoes to barrel 8, which is a rotary driven element. As a further refinement, the opposed concave inner faces of the shoes are so formed as to have substantially straight surfaces 46, bounded radially outwardly by ledges 42 and sharply converging bevelled surfaces 43 radially outwardly of the ledges. At a normal unexcessive speed of rotation of barrel 8, and consequently of the shoes of the brake assembly, spring 35 maintains the balls 32 in their inner positions shown in dotted lines in Figure 3, and shown in full lines in Figure 1, between the substantially straight surfaces 46. When, however, the speed of rotation of barrel 8, and the brake shoes 33 and 34, becomes excessive, balls 32, in being thrown radially outwardly by centrifugal force, first ride over the ledges 42 and then suddenly become increasingly effective, due to the sharp inclines 43 to quickly and effectively spread shoes 33 and 34 to force them against stationary drums 39 and 40 as a quickly effective brake.

Member 12 has been previously referred to as the load, or the work to be done. It has also been referred to as representing a drop type aircraft landing gear, a bomb bay door, or the like. The purpose of Figure 6 is merely to show the actuator secured by such means as a bracket 56 to an aircraft that is schematically shown. Member 12 is shown to have external screw threads 47 that engage internal screw threads in a collar 48. Also pivotally connected to the aircraft at 52 is a landing gear shock absorbing strut 53, of conventional design, that is pivotally connected at its lower end to axle 51 of a landing wheel 54. A cross strut may have its ends pivotally connected to the strut 53 and collar 48. The landing gear is of the drop type in that upon release of the usual latch to hold it retracted within the aircraft, the gravity effect of its weight tends to allow it to become extended into the position shown in Figure 6 for landing purposes.

In Figure 7, I have shown a wiring diagram for the actuator. The armature 57 of the actuator motor is shown to be connected at its one end through an interpole winding 60 to the solenoid, here shown by electrical symbol at 61, and to an electrical source 62 and thence to a double throw switch 63 alternately engageable with spaced contacts 64 and 65. The other end of armature 57 may be connected by a line through a series field winding 59 for clockwise rotation of the armature, to contact 65, and through a series field winding 58, for counterclockwise rotation of the armature, to contact 64.

In the landing gear extension operation the motor 1 is producing positive torque in the opposite direction to that required in retraction of the landing gear. This torque is transmitted through the planetary system and through the torque release mechanism which is again effective to drive the barrel 8. However, since the torque is in the opposite direction to that required for landing gear retraction, the over-riding clutch 13 will not engage the output shaft 9 because the sprags 29 of the over-riding clutch 13 are positioned for drive in the other direction. Therefore, the torque set up by the rotation of the barrel 8 is transferred through the single clutch plate 38, whose internal teeth mesh with pinion 20 rigid with the output shaft 9, to drive the latter, the bevel gear 10 and the work 12.

From the foregoing, it will be seen that there has been provided an effective and foolproof mechanism that is particularly adaptable as a means for the retraction and extension of aircraft landing gear including a manually and automatically reversible electric motor, a reduction gear train, a torque release mechanism rendered effective by a solenoid and pull rod and an over-riding clutch driven one way by the torque release mechanism for landing gear retraction. There has also been provided adequate means for utilizing the weight of the landing gear for drop type extension, brake means for the prevention of excessive drop speed and torque release driving mechanism for insurance of complete extension.

It is to be understood, that while the assembly has been described as particularly adapted for use as a means of retraction and extension of landing gear, it is also adapted for other uses, especially for rotatably driving elements selectively in either direction.

I claim:

1. In a load raising and lowering actuator, a reversible electric motor and shaft, an actuator output shaft adapted to drive the load and driving means between said motor shaft and output shaft including a reduction gear train driven by said motor shaft, a multiple friction plate torque release in engagement with said gear train carrier for said torque release, an over-riding clutch in driving engagement with said torque release carrier and output shaft, a solenoid, a solenoid rod operated by said solenoid to be retracted when said solenoid is energized to compress the plates of said torque release for rendering said torque release an effective driving means between said gear train and said carrier, for raising said load while said motor and shaft are rotating in a given direction and while said solenoid remains energized, said load being adapted to be released for lowering by gravity drop while said motor and shaft are operating in a direction opposite to that for load raising, said motor, upon speed of load drop exceeding that of said motor and shaft while said torque release remains effective as a drive, being adapted to reduce in current value to release said solenoid and render said torque release ineffective as a drive, braking means carried by said torque release carrier centrifugally responsive to the rotation of said carrier at a speed in excess of that of said motor to brake said load drop, said solenoid, upon the braking action of said carrier, being adapted to be reenergized to compress the plates of said torque release to reenergize said solenoid and reestablish said torque release in driving engagement between said gear train and output shaft.

2. An actuator for raising and lowering a load of the drop type comprising a reversible electric motor and shaft and a gear train driven thereby, an actuator output shaft in driving engagement with said load, a multiple friction plate torque release in engagement with said gear train, a torque release carrier which also carries an over-riding clutch in engagement with said output shaft, a solenoid and a solenoid rod operated by said solenoid to be retracted when said solenoid is energized for compressing the plates of said torque release for rendering said torque release an effective drive between said gear train and said clutch to drive said output shaft to raise said load and means for lowering said load by gravity and regulating its speed of drop, said last named means comprising braking means, carried by said rotating torque release carrier, said breaking means including centrifugally responsive members that are centrifugally responsive to a speed greater than that of the reverse rotation of said motor and shaft for load lowering purposes while said over-riding clutch remains ineffective and upon deenergization of said solenoid in response to said excess speed load drop, for braking the rotation of said carrier, said solenoid upon the braking action on said carrier by said brake, being adapted to be reenergized to retract said solenoid rod to compress the plates of said torque release to reestablish said torque release as a driving means between said gear train and said output shaft.

3. An actuator for raising and lowering a load of the drop type comprising a reversible electric motor and shaft and a gear train driven thereby, an actuator output shaft in driving engagement with said load, a multiple friction plate torque release in engagement with said gear train, a torque release carrier which also carries an over-riding clutch in engagement with said output shaft, a solenoid and a solenoid rod operated by said solenoid to be retracted when said solenoid is energized for compressing the plates of said torque release for rendering said torque release an effective drive between said gear train and said clutch to drive said output shaft to raise said load and means for lowering said load by gravity and regulating its speed of drop, said last named means comprising braking means, carried by said rotating torque release carrier and centrifugally responsive to a speed greater than that of the reverse rotation of said motor and shaft for load lowering purposes while said over-riding clutch remains ineffective and upon deenergization of said solenoid in response to said excess speed load drop, for braking the rotation of said carrier, said solenoid upon the braking action on said carrier by said brake, being adapted to be reenergized to retract said solenoid rod to compress the plates of said torque release to reestablish said torque release as a driving means between said gear train and said output shaft, said braking means comprising a pair of opposed concave shoes with a series of balls therebetween carried by said carrier and drums adjacent the outer faces of said shoes and carried by the stationary housing for said actuator.

4. An actuator for raising and lowering a load of the drop type comprising a reversible electric motor and shaft and a gear train driven thereby, an actuator output shaft in driving engagement with said load, a multiple friction plate torque release in engagement with said gear train, a torque release carrier which also carries an overriding clutch in engagement with said output shaft, a solenoid and a solenoid rod operated by said solenoid to be retracted when said solenoid is energized for compressing the plates of said torque release for rendering said torque release an effective drive between said gear train and said clutch to drive said output shaft to raise said load and means for lowering said load by gravity and regulating its speed of drop, said last named mean comprising braking means, carried by said rotating torque release carrier and centrifugally responsive to a speed greater than that of the reverse rotation of said motor and shaft for load lowering purposes while said overriding clutch remains ineffective and upon deenergization of said solenoid in response to said excess speed load drop, for braking the rotation of said carrier, said solenoid upon the braking action on said carrier by said brake, being adapted to be reenergized to retract said solenoid rod to compress the plates of said torque release to reestablish said torque release as a driving means between said gear train and said output shaft, said braking means comprising a pair of opposed concave shoes with a series of balls therebetween carried by said carrier and drums adjacent the outer faces of said shoes and carried by the stationary housing for said actuator, the opposed concave faces of said shoes providing a housing for said balls and having radially disposed abrupt ledges and converging inclined portions to spread said shoes into frictional braking engagement with said drums as said balls are thrown outwardly by centrifugal force in response to excessive speed of rotation of said carrier.

RICHARD E. SEARS.

REFERENCES CITED

The following references are of record in the file of this patent:

UNITED STATES PATENTS

| Number | Name | Date |
|---|---|---|
| 1,916,173 | Lansing | June 27, 1933 |
| 1,927,714 | Nardone | Sept. 19, 1933 |
| 1,939,405 | Nardone | Dec. 12, 1933 |
| 2,429,425 | Nardone | Oct. 21, 1947 |
| 2,451,109 | Nardone | Oct. 12, 1948 |
| 2,479,019 | Ochtman | Aug. 16, 1949 |
| 2,480,212 | Baines | Aug. 30, 1949 |